United States Patent Office 3,499,870
Patented Mar. 10, 1970

3,499,870
POLYMERIZING ORGANOSILICON COMPOUNDS WITH SULFUR-CONTAINING ORGANO TIN CATALYSTS
Ronald O. Hadlock and Martin E. Sorkin, Greensboro, N.C., assignors to Dow Corning Corporation, Midland, Mich., a corporation of Michigan
No Drawing. Continuation-in-part of application Ser. No. 601,840, Dec. 15, 1966. This application Mar. 8, 1968, Ser. No. 711,503
Int. Cl. C08g 31/40; C07f 7/08
U.S. Cl. 260—46.5          4 Claims

ABSTRACT OF THE DISCLOSURE

Organosilicon compounds containing the SiOH group are polymerized with diorgano tin compounds having the configuration $\equiv$SnSCH$_2$COO— (e.g.

$$(C_4H_9)_2Sn[SCH_2COOC_4H_9]_2)$$

The cured products are superior for release applications.

---

This application is a continuation-in-part of applicants' parent application Ser. No. 601,840, filed Dec. 15, 1966, now abandoned.

It has long been known that diorgano tin salts are catalysts for polymerization of organosilicon compounds. They have been employed extensively, for example, as cross linking catalysts in room temperature vulcanizing silicon rubber. The organo tin compounds heretofore employed have been of the type $R_2Sn(OAc)_2$ in which R is an alkyl group and Ac is an acyl radical of a fatty acid. In spite of their proven utility this type of tin compounds suffers from several disadvantages. One is the relative instability of the compound as shown by loss of activity upon standing, particularly under moist conditions. Then phenomenon is even more pronounced when the catalyst is in the form of an aqueous emulsion. It is necessary, of course, to employ aqueous emulsions of catalysts with organosilicon coating compositions which are in emulsion form. For example, a wide variety of organosilicon release coatings for paper are applied from emulsion and thereafter cured.

Under these conditions, it is necessary for the catalyst emulsion to be stable on storage. It is also necessary for the coating bath to remain stable during the coating process when a mixture of the catalyst emulsion and the organosilicon emulsion is applied to the paper by various mechanical means. This may involve pumping the emulsion and smearing it on the surface of the paper with coating rolls or a coating knife, or spraying the emulsion onto the paper through orifices. This mechanical agitation and stress has a great tendency to break down the emulsion, and particularly to reduce the effectiveness of the catalysts.

The problems encountered with the heretofore employed tin catalysts have been solved or greatly reduced by the use of a catalyst hereinafter described.

Another problem which has been found with previously employed organotin compounds lies in the realm of food release. In this application solutions of phenylmethylsiloxane resins are applied to cooking surfaces and thereafter cured. One type of such resin is particularly suitable for use on frying pans, baking dishes, and other ovenware. The goal is to provide easy release for all types of foods so as to obviate or reduce to a minimum the use of grease and to make the cleaning of the utensil much easier. It has been found that when the catalysts hereinafter described are employed, the release capability of siloxane film is greatly enhanced.

This invention relates to a method of polymerizing organosilicon compounds (1) containing at least one SiOH group and on the average from 0.9 to 3 organic groups attached to the silicon through Si—C linkages which comprises contacting said organosilicon compound with (2) a catalyst of the formula $R_2Sn(SCH_2COOR')_2$ in which R is a monovalent hydrocarbon radical and R' is an alkyl radical, at a temperature sufficient to cause an increase in the molecular weight of the organosilicon compound.

The catalysts employed herein are useful as polymerization catalysts in which the molecular weight of the organosilicon compound is increased and especially as curing catalysts in which a polyfunctional organosilicon compound is rendered insoluble and infusible. The operativeness of the compositions of this invention applies to any organosilicon compound containing at least one Si—OH group. In addition, the organosilicon compound can contain other types of silicon functional groups (SiX) which react with water to produce Si—OH groups, or which react directly with Si—OH groups to produce Si—O—Si bonds with the elimination of HX.

This means then one can mix the catalyst with a silicon compound containing only SiX groups and then expose the mixture to moisture. The latter will hydrolyze the X groups to OH and the latter will be condensed by the catalyst to cause polymerization of the silicon compound.

As is well known, such X groups include hydrogen; alkoxy groups such as methoxy, ethoxy and

—OCH$_2$CH$_2$OCH$_3$ acyloxy groups such as acetoxy, propionyloxy and benzoyloxy; ketoxime groups such as —ON=C(CH$_3$)$_2$; carbamate groups such as

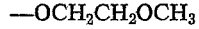

groups of the formula ONY$_2$, in which Y is a hydrocarbon radical such as methyl, ethyl or phenyl; halogen atoms such as Cl, Br and F; and any other hydrolyzable groups attached to the silicon.

The organosilicon compounds employed herein are those which contain on the average from 0.9 to 3 organic groups which are attached to the silicon through Si—C linkages (R″). For the purpose of this invention it is immaterial what type of substituent is so attached to the silicon. Thus, the substituent group can be any hydrocarbon or any substituted hydrocarbon group. Preferably, the substituents are hydrocarbon groups such as aliphatic hydrocarbons, such as methyl, ethyl, octadecyl, myricyl, vinyl, allyl, hexenyl and isopropyl; cycloaliphatic hydrocarbon groups such as cyclohexyl, cyclopentyl, methylcyclohexyl, cyclohexenyl and methylcyclohexenyl; aromatic hydrocarbon groups such as phenyl, tolyl, xenyl, xylyl and naphthyl; and aralkyl groups such as benzyl, β-phenylethyl, and β-phenylpropyl.

The preferred substituent groups can also be any halogenated hydrocarbon radical such as chloromethyl, gamma-chloropropyl, bromooctadecyl, chlorophenyl, bromoxenyl, fluorocyclohexyl, chlorobutenyl, α,α,α-trifluorotolyl, 3,3,3-trifluoropropyl, and C$_7$F$_{15}$CH$_2$CH$_2$—. Other substituted hydrocarbon radicals can be hydrocarbon ether radicals such as —(CH$_2$)$_3$O(CH$_2$CH$_2$O)$_6$CH$_3$ and —(CH$_2$)$_3$OC$_2$H$_5$; ester groups such as

—(CH$_2$)$_3$OOCCH=CH$_2$

—(CH$_2$)$_6$OOCCH$_3$ and —CH$_2$CH$_2$COOC$_2$H$_5$; nitrile groups such as —CH$_2$CH$_2$C≡N, —(CH$_2$)$_3$C≡N and

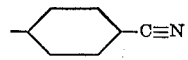

and hydrocarbon groups substituted with amino, amido and sulfide groups. The most preferred substituents on the silicon are alkyl, vinyl, phenyl and $R_fCH_2CH_2$— radicals where $R_f$ is a perfluoroalkyl radical.

Structurally, the organosilicon compounds employed herein can be any combination of units of the formulae $R''SiO_{3/2}$, $R''_2SiO$, $R''_3SiO_{1/2}$, and limited amounts of $SiO_{4/2}$ units. The organosilicon compounds can also contain silicon atoms which are linked directly to other silicon atoms or are linked to silicon atoms through divalent hydrocarbon atoms such as methylene, dimethylene, hexamethylene, phenylene and xylylene or hydrocarbon ether radicals such as —$C_6H_4OC_6H_4$—; silazine linkages such as

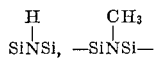

and sulfide linkages such as SiSSi.

The organosilicon compound can be contacted with the catalyst of this invention at any stage in its degree of polymerization. Thus one can contact silanols or diols with the tin compound or one can contact siloxanols having a high degree of polymerization in order to affect the final cure of the compositions.

The organo tin compounds employed herein are commercially available materials. They can be made by reacting tin oxides of the formula

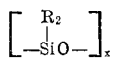

with mercaptides of the formula $HSCH_2COOR'$. The tin oxide is readily prepared by the hydrolysis of $R_2SnCl_2$, which in turn is readily prepared by reacting $RMgCl$ with $SnCl_4$.

For the purpose of this invention R can be any hydrocarbon radical such as methyl, ethyl, butyl, octyl, octadecyl, myricyl, phenyl, tolyl, vinyl, allyl, benzyl, or xenyl and R' can be any alkyl radical such as methyl, ethyl, butyl, octyl, octadecyl and myricyl. It is preferred that both R and R' be alkyl radicals of at least four carbon atoms.

The proportion of catalyst is not critical for carrying out this invention. In general, as with any catalyst, one prefers to employ the smallest amount necessary to cause proper polymerization. The temperature of polymerization is not critical and varies widely depending upon the nature of the organosilicon compound. With some compounds polymerization will take place at room temperature or below, and with others, elevated temperatures are needed. Also the temperature employed varies with the time required for carrying out the polymerization. Thus, for example, elevated temperatures may be needed to cure a coating in a few seconds, whereas room temperature would suffice if the coating could be cured over a period of 24 hours.

The catalyst of this invention can be used in preparation of laminates, molded articles and in the curing of films and coatings, with either resinous, fluid or rubbery compositions.

The following examples are illustrative only and should not be construed as limiting the invention which is properly delineated in the appended claims.

EXAMPLE 1

This example illustrates the superior performance of a commercial organosilicon food release composition when catalyzed with di-N-octyltin-di-iso-octylmercaptoacetate (1) as compared with the release obtained with other organo tin catalysts. The formulation used in each test infra was in weight percent as follows:

3.10 of a methylphenylpolysiloxane resin containing 4% by weight silicon-bonded OH groups and having a phenyl to silicon ratio of 0.53 and a total methyl and phenyl to silicon ratio of 1.35, 0.01 monomethylether of dipropylene glycol, 0.20 of a hydroxylated dimethylpolysiloxane fluid having 4.2% by weight Si bonded OH, 1.79 methyltriacetoxysilane and 94.90 of 1,1,1-trichloroethane.

To various batches of the above formulation was added the following catalysts in each case in amount of 1 part by weight tin per 100 parts by weight total organosilicon solids.

(1) di-N-octyltin-di-iso-octylmercaptoacetate
(2) di-octyltin-di-octoate
(3) di-octyltin-di-laurate
(4) di-butyltin-di-laurate Each catalyzed formulation was placed in a closed container and stored for the time and at the temperature shown in the tables infra. Each was then applied to an aluminum frypan and allowed to air dry. Eggs were then fried at 275° F. in the coated pan without any grease and the number of times satisfactory release was obtained was recorded.

Three different lost of the phenylmethyl resin was employed and are designated I, II and III below.

In this set of experiments the materials were mixed and tested at once and then aged at 70° F. and tested after the number of times specified.

| Catalyst | Ageing time in months | | | | | | | | | |
|---|---|---|---|---|---|---|---|---|---|---|
| | Lot I | | | | | Lot II | | | Lot III | |
| | 0 | 2 | 3 | 5 | 6 | 4 | 5 | 6 | 5 | 6 |
| (1) | 83 | 86 | 87 | 66 | 84 | 71 | 66 | 83 | 62 | 78 |
| (2) | 33 | | 42 | | 96 | 63 | | | 31 | |
| (3) | ¹50 | | 43 | | 87 | 23 | | | 8 | |
| (4) | 53 | 72 | 65 | 45 | 37 | 25 | 29 | 65 | 53 | 73 |

¹ Experiment stopped after 50 releases.

In this set of experiments each sample was aged in the container at the specified temperature and then checked for egg release as shown above.

| Catalyst | Temperature (° F.) | Ageing time in months | | | | | | | | |
|---|---|---|---|---|---|---|---|---|---|---|
| | | Lot II | | | | Lot II | | | Lot III | |
| | | 2 | 3 | 5 | 6 | 4 | 5 | 6 | 5 | 6 |
| (1) | 100 | 77 | 94 | 54 | 58 | 51 | 129 | 73 | 73 | 73 |
| (4) | 100 | 59 | 100 | 80 | 71 | 46 | 54 | 83 | 54 | 68 |
| (1) | 120 | 75 | 70 | 90 | 130 | 85 | 108 | 67 | 101 | 72 |
| (4) | 120 | 62 | 60 | 66 | 59 | 35 | 53 | 114 | 70 | 49 |
| (1) | 150 | 90 | 35 | 34 | 38 | 113 | 109 | 79 | 78 | 52 |
| (4) | 150 | 0 | 55 | 52 | 51 | 46 | 52 | 76 | 77 | 77 |

Measuring food release is not a particularly precise determination so it is necessary to check a relatively large number of samples in order to determine which product is, in fact superior. The superiority of (1) is shown by the fact that it gave superior release with respect to all the catalysts in 26 cases, to at least one other catalyst in 29 cases and was inferior in only 10 cases. Furthermore, catalyst (1) was superior in 9 out of 10 cases upon ageing at 70° F. which is the normal storage conditions for a commercial product.

EXAMPLE 2

This example shows the stability of the catalysts of this invention in aqueous emulsion and to mechanical stress.

The catalyst emulsion was prepared by mixing in weight percent.

1.875 polyvinyl alcohol
0.500 dodecyl benzene sodium sulfonate
14.875 water
and then adding a mixture of
20.00 di-N-octyltin-di-iso-octyl-mercaptoacetate
6.00 tetrachloroethylene
24.00 toluene
and a mixture of
30.75 water
2.00 glycerin.

The emulsion contained 20% by weight catalyst.

The siloxane emulsion had the following composition in weight percent:
- 38.800 OH endblocked dimethylpolysiloxane fluid
- 1.200 methylhydrogen polysiloxane
- 4.500 toluene
- 5.500 perchloroethylene
- 47.077 water
- 1.875 polyvinyl alcohol and
- 1.048 octylphenyl polyethoxy ethanol 25 parts by weight of the siloxane emulsion was mixed with 2.5 parts of the catalyst emulsion and 72.5 parts water. The resulting emulsion was applied to parchment paper with a glass rod and cured 2 minutes at 250° F. Excellent cure of the siloxane was obtained as shown by the good release values which remained essentially constant as the bath aged.

| Age of coating emulsion in hrs. | Release in g. | Subsequent adhesion |
| --- | --- | --- |
| 0 | 5 | 160 |
| 2 | 5 | 145 |
| 4 | 5 | 142 |
| 5 | 6 | 140 |
| 6 | 6 | 140 |
| Blank | 268 | |

The release was determined by applying a Johnson and Johnson surgical adhesive tape to the cured siloxane and measuring the force required to remove the tape from the surface by pulling at 180° angle. The tape so removed was then applied to a steel panel and the force required to remove the tape is measured. The values above show that the tape released easily from the coated paper and that no appreciable siloxane adhered to the tape because of the excellent adhesion to the steel.

The excellent stability of the emulsion to mechanical working was shown by the fact that the emulsion did not gel or oil during 6 hours operation on coating rolls at 10 yards per minute. This shows a roll stability of greater than 6 hours.

EXAMPLE 3

Excellent cures are obtained when the following catalysts are used with the composition of claim 1.

$(C_4H_9)(CH_2=CH)Sn[SCH_2COOC_{25}H_{51}]_2$
$(C_2H_5)_2Sn[SCH_2COOC_8H_{17}]_2$
$(C_4H_9)(C_6H_5)Sn[SCH_2COOC_{10}H_{21}]_2$
$(C_6H_{11})_2Sn[SCH_2COOC_6H_{13}]_2$
$(C_{18}H_{37})_2Sn[SCH_2COOCH_3]_2$
$(C_4H_9)_2Sn[SCH_2COOC_8H_{17}]_2$
naphthyl(butyl)Sn[SCH_2COOC_6H_{13}]_2
$(C_6H_5CH_2CH_2)_2Sn[SCH_2COOC_6H_{13}]_2$

EXAMPLE 4

Polymerization occurs when the following organosilicon compounds are mixed with the catalyst of Example 1 and heated as shown below.

| Temperature, ° C. | Organosilicon compound |
| --- | --- |
| 30 | Mixture of 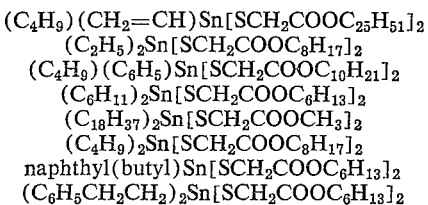 H and |
| 150 | Ethylpolysilicate $(C_5H_4)_2Si(OH)_2$ |
| 150 | Mixture of HO$\left[\begin{array}{c}C_6H_5\\|\\Si-O\\|\\CH_3\end{array}\right]_{20}$ H and |
| | 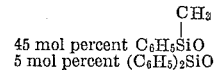 |
| 30 | Mixture of HO$\left[\begin{array}{c}CH=CH_2\\|\\Si-O\\|\\CH_3\end{array}\right]_{40}$ H and |
| 150 | $CH_2=CHSi[ON=C(CH_3)_2]_3$ A SiOH containing copolymer of— 20 mol percent $CH_3SiO_{3/2}$ 10 mol percent $C_{18}H_{37}SiO_{3/2}$ 20 mol percent $C_6H_5SiO_{3/2}$ 45 mol percent $C_6H_5\overset{CH_3}{\underset{|}{Si}}O$ 5 mol percent $(C_6H_5)_2SiO$ |

That which is claimed is:
1. A method of polymerizing organosilicon compounds (1) containing at least one SiOH group and any remaining silicon valences in said organosilicon compound being satisfied by radicals selected from the group consisting of silicon-bonded oxygen atoms attached to other silicon atoms to form the siloxane linkage, silicon-bonded nitrogen radicals to form the silazane linkage, silicon-bonded sulfur radicals to form the Si—S—Si linkage, Si—Si linkage, and organic groups attached to the silicon through the SiC linkage selected from the group consisting of disilylolkylene, disilylarylene, disylhydrocarbon ether linkage, monovalent hydrocarbon, monovalent halohydrocarbon, monovalent hydrocarbon ether, nitrile-substituted monovalent hydrocarbon, ester substituted monovalent hydrocarbon, and monovalent hydrocarbon group substituted with an amino amido, and sulfide groups, there being on the average from 0.9 to 3 of said organic groups attached to the silicon which comprises contacting said organosilicon compound with
(2) a catalyst of the formula $R_2Sn(SCH_2COOR')_2$ in which R is a monovalent hydrocarbon radical and R' is an alkyl radical, at a temperature sufficient to cause an increase in the molecular weight of the organosilicon compound.

2. The method of claim 1 in which the organic groups attached to the silicon are selected from the group consisting of alkyl, phenyl, vinyl and $R_fCH_2CH_2$—, where $R_f$ is a perfluoroalkyl radical, and R and R' are alkyl radicals of at least 4 carbon atoms.

3. The method of claim 1 in which (2) is di-N-octyltin-di-iso-octyl mercaptoacetate.

4. The method of claim 2 in which (2) is di-N-octyltin-di-iso-octyl mercaptoacetate.

References Cited

UNITED STATES PATENTS 2,842,516   7/1958   Nitzshe et al. _____ 260—37
3,194,770   7/1965   Hostettler _____ 252—431

DONALD E. GZAJA, Primary Examiner

M. I. MARQUIS, Assistant Examiner

U.S. Cl. X.R.

117—135.1; 260—29.2, 285, 429.7, 448.2